United States Patent [19]

Nagata et al.

[11] 4,434,923
[45] Mar. 6, 1984

[54] APPARATUS FOR SEPARATING CASTINGS INTO NECESSARY AND UNNECESSARY PIECES

[75] Inventors: Kazuo Nagata; Susumu Ishii, both of Toyama, Japan

[73] Assignee: Yoshida Kogyo K. K., Tokyo, Japan

[21] Appl. No.: 383,985

[22] Filed: Jun. 1, 1982

[30] Foreign Application Priority Data

Jun. 20, 1981 [JP] Japan .................................. 56-95756

[51] Int. Cl.³ .................................................. B26F 3/00
[52] U.S. Cl. ....................................... 225/97; 225/103; 241/175; 264/161; 425/806
[58] Field of Search ............................ 225/97, 93, 103; 264/161; 425/806; 241/175, 184

[56] References Cited

U.S. PATENT DOCUMENTS

| 3,172,588 | 3/1965 | Bertold et al. | 425/806 X |
| 3,270,929 | 9/1966 | Foster, Jr. | 225/97 |
| 3,767,096 | 10/1973 | Coscia | 225/97 |
| 3,965,231 | 6/1976 | Depka | 264/161 |
| 4,128,197 | 12/1978 | Ischenko et al. | 425/806 X |

Primary Examiner—Frank T. Yost
Attorney, Agent, or Firm—Hill, Van Santen, Steadman & Simpson

[57] ABSTRACT

An apparatus for continuously separating castings into necessary and unnecessary portions, which castings are automatically and continuously produced by a die casting machine. The castings are separated into the necessary and unnecessary portions by vibration applied to a conveyance mechanism and to a plurality of masses while the castings are conveyed along the conveyance mechanism, which comprises a plurality of bar members.

4 Claims, 4 Drawing Figures

APPARATUS FOR SEPARATING CASTINGS INTO NECESSARY AND UNNECESSARY PIECES

BACKGROUND OF THE INVENTION

1. Field of the Invention

This invention relates to a separating apparatus in which sprue, runner and overflow portions produced along with small machine parts (necessary pieces) manufactured by die casting are removed and separated from these parts.

2. Description of the Prior Art

In the prior art, a separation operation of the type described is divided into separating and sorting steps. In the separating step, a certain quantity of castings which exit from a die casting machine while still having sprue, runner and overflow portions attached thereto, are collected together and introduced into a separating apparatus where the castings are separated into the cast machine parts and the unnecessary pieces such as the sprue portions. In the sorting step, the separated machine parts and unnecessary pieces are sorted from one another.

The conventional separating apparatus ordinarily includes a so-called tumbler, namely a cylindrical vessel having a polygonal cross-section. The castings are introduced into the tumbler which is then rotated about its axis, causing the castings to rise and then fall within the tumbler. This operation is repeated a suitable number of times until the sprue, runner and overflow portions are separated from the machine parts owing to the impact and friction sustained by the castings as they strike one another.

Productivity is low with the conventional separating apparatus of this kind since the separating operation cannot start until the castings are gathered together, carried from the die casting machine to the separating apparatus and then introduced into the apparatus to fill the tumbler to the amount necessary for effecting separation by rotation. Since the quantity of castings charged into the tumbler is quite large, moreover, an extended period of time is required to separate the products in their entirety. This increases the chances of product deformation and flawing during separation, causing a decline in the product yield.

SUMMARY OF THE INVENTION

Accordingly, an object of the present invention is to provide and apparatus, attached to a die casting machine, for efficiently and continuously separating and sorting castings produced by the machine in an automatic and continuous manner, into small machine parts (necessary pieces) representing the final product, and unnecessary pieces such as sprue, runner and overflow portions.

Another object of the present invention is to produce an apparatus in which the separation of castings into machine parts and unnecessary pieces is carried out efficiently and at a high yield.

Still another object of the present invention is to provide a separating apparatus having means for feeding the separated unnecessary pieces back to the die casting machine to enhance overall efficiency.

These and other objects and features of the invention will be apparent from a detailed description which follows in connection with the accompanying drawings illustrating a preferred embodiment, in which like reference characters refer to like parts throughout the several views.

BREIF DESCRIPTION OF THE DRAWINGS

DESCRIPTION OF THE PREFERRED EMBODIMENT

Figure 1:
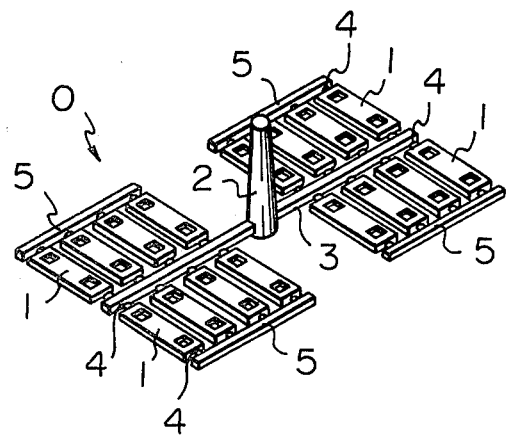
FIG. 1 is a perspective view showing an example of a casting which is to be separated by the separating apparatus of the invention.

As shown in FIG. 1, a casting O produced by a casting machine includes a number of necessary pieces 1, namely machine parts which in this case are pull-tabs to be attached to the slider of a slide fastener, the pull tabs consisting of a synthetic resin or of a metal such as a zinc alloy. In the well-known die casting process an article is molded by injecting a molten material into a cavity formed between a stationary mold and a movable mold which have been closed upon each other. The resulting casting is a unitary body which includes not only the necessary pieces 1 but also unnecessary pieces 2, 3, 4, 5 that form in the passageways for the molten material and in cavities for receiving overflow. Specifically, the unnecessary pieces 2, 3, 4, 5 denote molded pieces corresponding to the sprue, runners, gates and overflow cavities that are provided within the stationary and movable molds and, hence, are commonly referred to by the same terms.

The present invention is directed to an apparatus for separating the molding O into the necessary pieces 1 and unnecessary pieces (sprue 2, runner 3, gates 4 and overflows 5). The apparatus has a simple construction designed for installation on a die casting machine and is adapted to effect the separation continuously along with a sorting operation while automatically conveying the sorted unnecessary pieces back to the die casting machine where these pieces are received by a melting pot.

Figure 4:
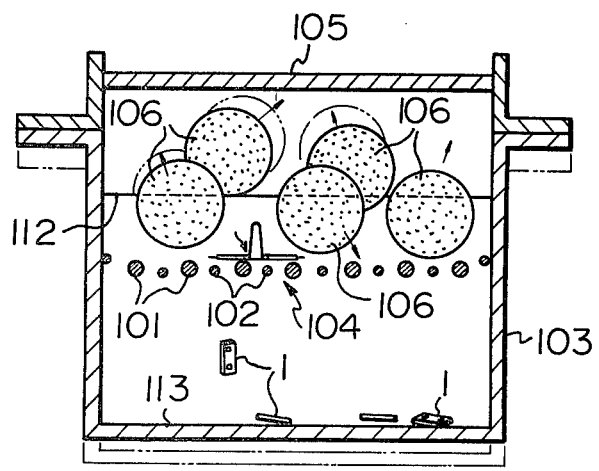
FIG. 4 is a sectional view taken on line IV—IV of FIG. 3.
Figure 2:
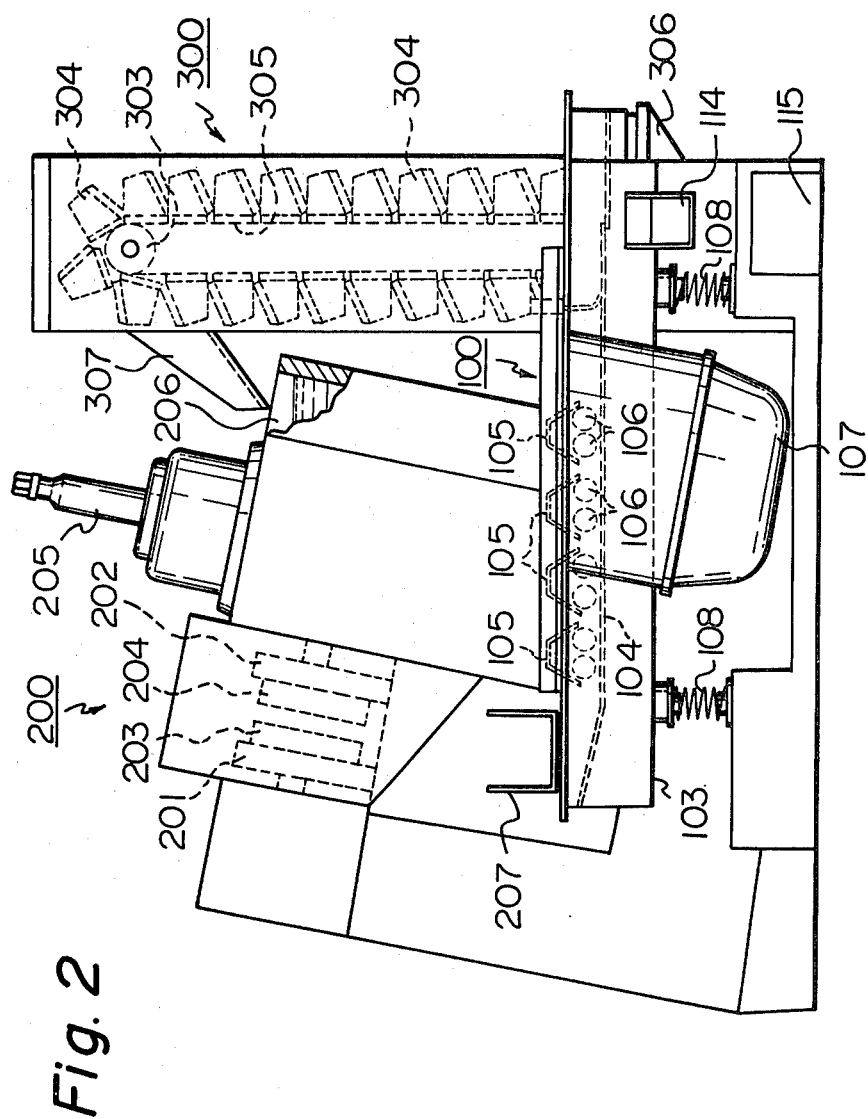
FIG. 2 is a side view showing an embodiment of the apparatus according to the invention provided on a die casting machine together with an apparatus for returning unnecessary pieces to the die casting machine for recycling.
Figure 3:
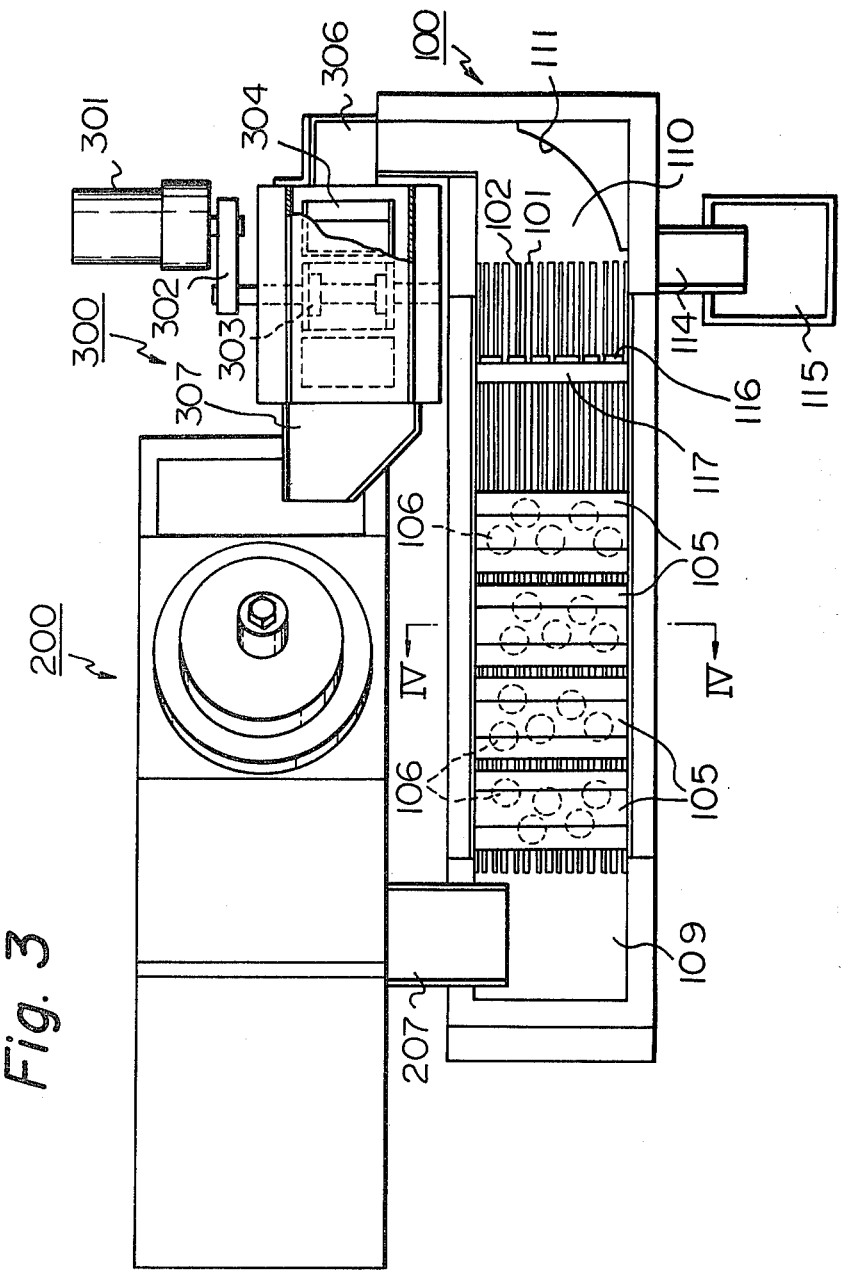
FIG. 3 is a plan view of the arrangement shown in FIG. 2.

Referring now to FIGS. 2 through 4, an embodiment of the separating apparatus, indicated generally at 100, is shown installed on a die casting machine 200 along with an apparatus 300 adapted to return the unnecessary portions of castings back to the die casting machine 200.

The separating apparatus 100 comprises a conveyance frame 103 in which being provided a conveyance mechanism 104 which includes a plurality of longitudinally extending rod or bar members 101, 102 juxtaposed in parallel and supported by the conveyance frame 103, a plurality of laterally extending covers 105 disposed above the conveyance mechanism 104, a plurality of freely movable masses 106 confined within the region bounded by the conveyance mechanism 104 and each cover 105, and vibrating means 107 for vibrating the conveyance mechanism 104 through the intermediary of the conveyance frame 103. Springs 108 are provided for resiliently supporting the conveyance frame 103 on a base.

The masses 106 move randomly within the space defined by the conveyance mechanism 104 and cover 105 owing to the vibratory motion imparted by the vibrating means 107, and hence impact against the castings O. The masses 106 preferably are rubber or synthetic resin spheres, but may also be regular polyhedral or irregularly shaped bodies, and metal can be employed as an alternative construction material. However, in order to separate the castings into the machine parts and unnecessary pieces effectively owing to the impact between the castings and masses, as will be described below, and in order to effect such separation without damaging the machine parts, it is required that the masses 106 have sufficient weight, and that their surfaces be sufficiently smooth.

The die casting machine 200 includes a movable bolster 201 and a stationary bolster 202, and the movable bolster 201 and stationary bolster 202 carry a movable mold 203 and a stationary mold 204 thereon, respectively. The movable and stationary molds 203, 204 are adapted to be brought into pressured contact to delimit a molding cavity for forming the casting O, shown in FIG. 1. An injection cylinder 205 is provided to inject the molten molding material, contained in a melting pot 206, into the molding cavity formed between the molds 203, 204. The injected material flows through the sprue 2, runners 3 and gates 4 to fill the molds 1 for the machine parts, and overflows from the molds 1 into the overflow portions 5 through the gates 4, thereby molding the casting O of the type shown in FIG. 1.

When the movable mold 203 and stationary mold 204 are opened, the casting O drops into an underlying chute 207 and is fed into the inlet 109 of the novel separating apparatus 100.

The separating apparatus 100, whose actions and effects will be described in further detail hereinbelow, separates the casting O into necessary pieces namely the machine parts and unnecessary pieces such as the sprue 2 and runners 3, which are discharged from the outlet 110 of the separating apparatus and guided to the return apparatus 300 by means of a guide member 111.

The apparatus 300 for returning the unnecessary pieces to the melting pot 206 comprises upper and lower chain gears 303 (of which only the upper chain gear is shown) driven by a motor 301 and V-belt 302, a chain 305 conveyed by the chain gears 303 and carrying a number of buckets 304, and chutes 306, 307. The unnecessary pieces introduced by the guide member 111 are fed into the buckets 304 by the chute 306, and the buckets 304 are lifted by the circulating chain 305 and caused to empty their contents into the chute 307. The chute 307 introduces the unnecessary pieces into the melting pot 206 of the die casting machine 200 where they are remelted for use as the casting material.

Returning now to a more detalied description of the separating apparatus 100, the conveyance mechanism 104, supported by the conveyance frame 103 on the springs 108, extends from the inlet 109 to the outlet 110. The vibrating means 107, such as a motor, is adapted to vibrate the conveyance frame 103 and, hence, the conveyance mechanism 104, in such a manner that the conveyance mechanism and frame are repeatedly tilted downwardly at the right-hand end thereof. Accordingly, casting O fed into the inlet 109 of the conveyance mechanism 104 via the chute 207 are transferred along the path of conveyance mechanism 104 from left to right in FIGS. 2 and 3. The space between the conveyance mechanism 104 and the lower edge 112 (FIG. 4) of each cover 105 is set to be greater than the maximum height of each casting O but less than the diameter of each mass 106. As the conveyance mechanism 104 is vibrated via the conveyance frame 103, therefore, the masses 106 are retained under the covers 105, but the castings are advanced rightwardly along the bar members 101, 102 toward the outlet 110 of the conveyance mechanism while passing below the covers 105, during which time they are separated into the necessary pieces and unnecessary pieces owing to the impact inflicted by the masses 106 which are randomly vibrated between the conveyance mechanism 104 and covers 105 by the action of the vibrating means 107. In the illustrated embodiment, the bar members 101, 102 differ in diameter, as seen in FIG. 4. Such an arrangement causes the masses 106 to move and rebound in a more complex manner than if the rod members were all of the same diameter, and therefore improves the efficiency of the separation operation. Since the machine parts 1 and overflow portions 5 of the castings O are similar in shape and size, as shown in FIG. 1, following separation from the casting both will fall through the spaces between adjacent bar members 101, 102 and drop onto the floor 113 of the conveyance frame 103, and both will be conveyed toward the right-hand end of the apparatus owing to the vibrational motion described above. A discharge port 114 is provided at the right-hand end of the conveyance frame 103 adjacent to the terminus of the conveyance mechanism 104 and is adapted to receive the machine parts 1 and overflow pieces 5 and to discharge them into a waiting receptacle 115. The portions collected in the receptacle 115 may be sorted manually or mechanically by introducing them into a sorter. Meanwhile, the unnecessary pieces such as the sprue 2 and runners 3 are conveyed to the right along the bar members 101, 102 which are so spaced as to prevent these pieces from falling onto the floor 113 of the frame 103. These pieces are led to the return apparatus 300 by the guide member 111 and are fed into the buckets 304 via the chute 306 to be returned to the melting pot 206, as described above.

Numeral 116 denotes a rubber screen secured to the conveyance frame 103 by a retaining screen 117 at a point just upstream of the discharge port 114. The machine parts 1 being conveyed along the bar members 101, 102 ordinarily fall through the spaces between the bar members before reaching the discharge port 114 at the terminus of the conveyance mechanism. The rubber screen 116 assures that all of the machine parts 1 will be delivered to the discharge port 114 by causing any of these parts that reach the screen to fall onto the floor 113 of the frame 103.

In the illustrated embodiment the machine parts fall through the spaces between the bar members 101, 102 and are conveyed separately of the unnecessary pieces. It is possible, however, to narrow the spaces between the bar members to convey the machine parts and unnecessary pieces together, after which they may be sorted by a separately provided sorter.

Since the separating apparatus 100 according to the present invention can be used by installing it on the die casting machine 200 along with the return apparatus 300, collection and transport of the castings need not be carried out by human labor. The result is a reduction in labor costs and greater productivity. Moreover, the machine parts will not be damaged by prolonged separation and sorting operations since these are completed for each individual casting every cycle of the die casting machine.

It is noteworthy that separation proceeds without difficulty even though separation immediately follows the die casting operation, that is, within a period of time during which the castings are still warm and, hence, flexible. In other words, since the masses 106 strike the castings repeatedly from all directions, the gates 4 between the machine parts 1 and runners 3, and between the machine parts 1 and overflow portions 5, are subjected to a repeated load and break off easily owing to fatigue, despite the flexibility of the warm material.

As many apparently widely different embodiments of the present invention may be made without departing from the spirit and scope thereof, it is to be understood that the invention is not limited to the specific embodiments thereof except as defined in the appended claims.

What is claimed is:

1. An apparatus for separating castings into necessary and unnecessary portions, which comprises:
    a conveyance frame providing a conveyance mechanism including a plurality of bar members juxtaposed in parallel and extending in the direction in which the castings are conveyed;
    at least one downwardly open cover member disposed above said conveyance mechanism and spaced away therefrom by a distance great enough to permit the passage of the castings conveyed along said conveyance mechanism;
    a plurality of freely movable masses confined between said conveyance mechanism and said cover mechanism; and
    vibration means for vibrating said conveyance frame;
    said castings being separated into necessary and unnecessary portions by impacting against said freely movable masses.

2. The apparatus according to claim 1, in which said plurality of bar members are spaced apart from one another by a distance great enough to permit the necessary portions to fall through the intervening spaces following separation from the unnecessary portions.

3. The apparatus according to claim 1, in which said plurality of bar members include members of at least two different diameters.

4. The apparatus according to claim 1, in which said masses are spherical in shape.

* * * * *